(12) United States Patent
Oliver et al.

(10) Patent No.: US 7,032,289 B2
(45) Date of Patent: Apr. 25, 2006

(54) STATOR BAR HANDLER

(75) Inventors: Stuart A. Oliver, Bourg, LA (US);
Gary L. Stewart, Monroeville, PA (US); John D. King, Columbiana, AL (US); Terry Bergeron, Houma, LA (US); Herbert Dupre, Jr., Houma, LA (US); Glenn B. Ferguson, Houma, LA (US); Farrell Gillaspie, Bourg, LA (US); Harold P. Leboeuf, Houma, LA (US); Eddie McMillis, Jr., Bourg, LA (US); Carrol J. Boyne, Jr., Morgan City, LA (US); James L. Roberts, Cumming, CA (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 10/284,484

(22) Filed: Oct. 31, 2002

(65) Prior Publication Data

US 2003/0072643 A1 Apr. 17, 2003

Related U.S. Application Data

(63) Continuation-in-part of application No. 10/151,975, filed on May 22, 2002, now abandoned.

(51) Int. Cl.
*H02K 15/00* (2006.01)
*H02K 15/14* (2006.01)
*H02K 15/16* (2006.01)

(52) U.S. Cl. .................. 29/596; 29/732; 212/180; 280/47.34; 414/427; 414/680; 414/745.1

(58) Field of Classification Search .................. 29/596, 29/732; 212/180; 280/47.34; 414/427, 680, 414/745.1
See application file for complete search history.

(56) References Cited

U.S. PATENT DOCUMENTS

| 3,858,735 | A | * | 1/1975 | Zrostlik ................. 414/427 |
| 4,508,233 | A |   | 4/1985 | Helms |
| 4,676,713 | A | * | 6/1987 | Voelpel ................. 414/590 |
| 5,083,895 | A | * | 1/1992 | McBirnie ................ 414/739 |
| 5,174,708 | A |   | 12/1992 | Ruder et al. |
| 5,553,991 | A |   | 9/1996 | Ferreira |
| 5,605,590 | A |   | 2/1997 | Manning et al. |
| 6,294,855 | B1 |  | 9/2001 | Kelleher |
| 6,321,439 | B1 |  | 11/2001 | Berrong et al. |
| 6,327,762 | B1 |  | 12/2001 | Kelleher |
| 2001/0004175 | A1 | | 6/2001 | Kelleher |
| 2002/0050063 | A1 | | 5/2002 | Iverson et al. |

* cited by examiner

*Primary Examiner*—Carl J. Arbes
(74) *Attorney, Agent, or Firm*—Ernest G. Cusick

(57) ABSTRACT

A flexible bar handler that comprises a mobile carriage; a lift boom assembly rotatably attached to rotate around a vertical axis of the carriage to swing a distal end of the boom assembly back and forth and pivotally attached to pivot around a horizontal axis of the carriage to raise and lower the distal end of the boom assembly; and a lift bracket comprising an elongated rail with receptor-shaped cross section to lengthwise accommodate a bar, the lift bracket being attached at a point on its length at the distal end of the longitudinal boom assembly opposed to a counter weight attached at an opposite proximal end of the boom assembly, wherein the lift bracket is pivotally attached to a horizontal pin at the point to permit the lift bracket to tilt to one side or the other so as to raise and lower the lift bracket ends. A method of handling a stator bar; comprises loading the bar into a lift bracket comprising an elongated rail with receptor-shaped cross section, wherein the lift bracket is part of a flexible bar handler that includes a mobile carriage; manipulating the lift bracket by (i) swinging an end of the boom assembly back and forth, (ii) raising or lowering an end of the boom assembly, (iii) tilting the lift bracket to tilt the bracket to one side or the other so as to raise and lower the

19 Claims, 4 Drawing Sheets

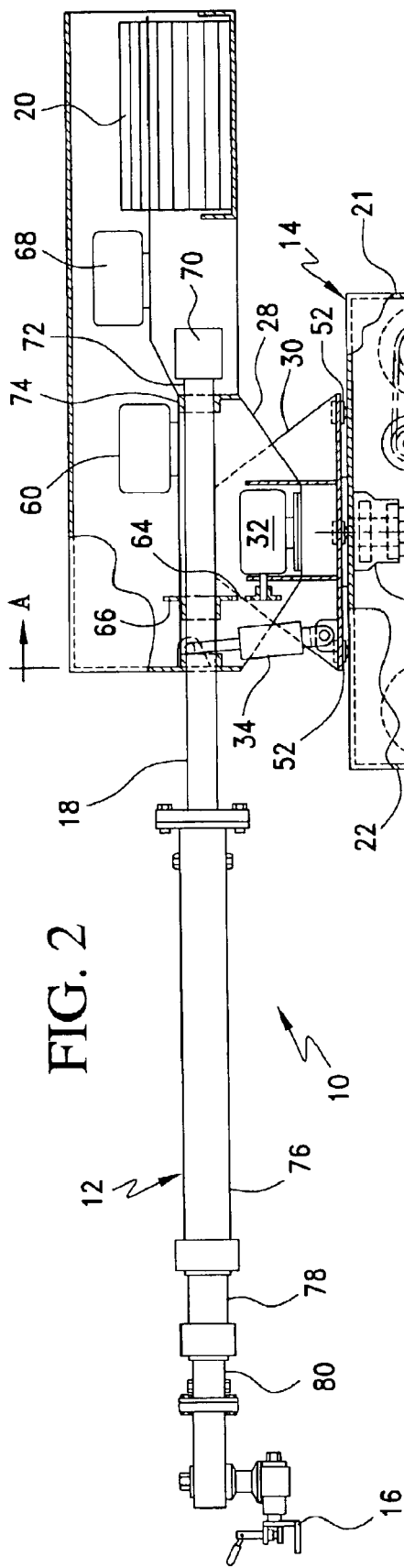
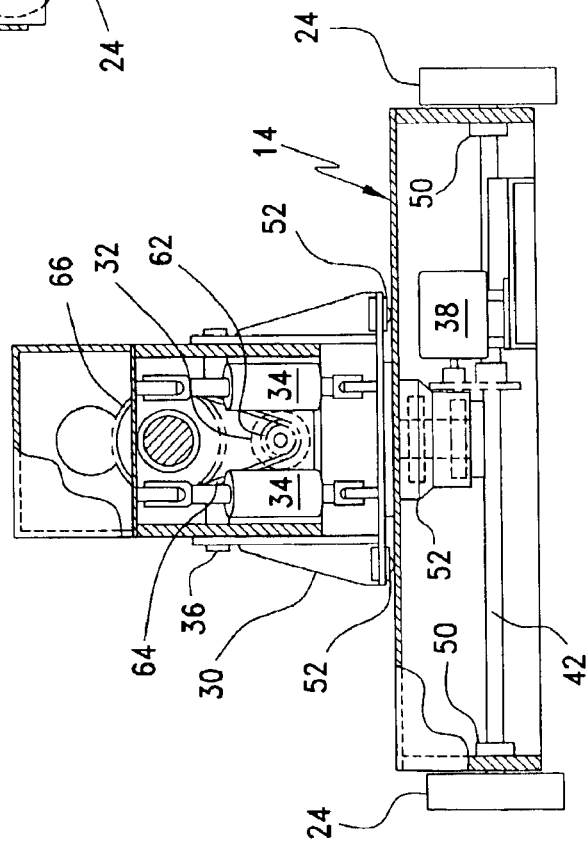
FIG. 2
FIG. 3

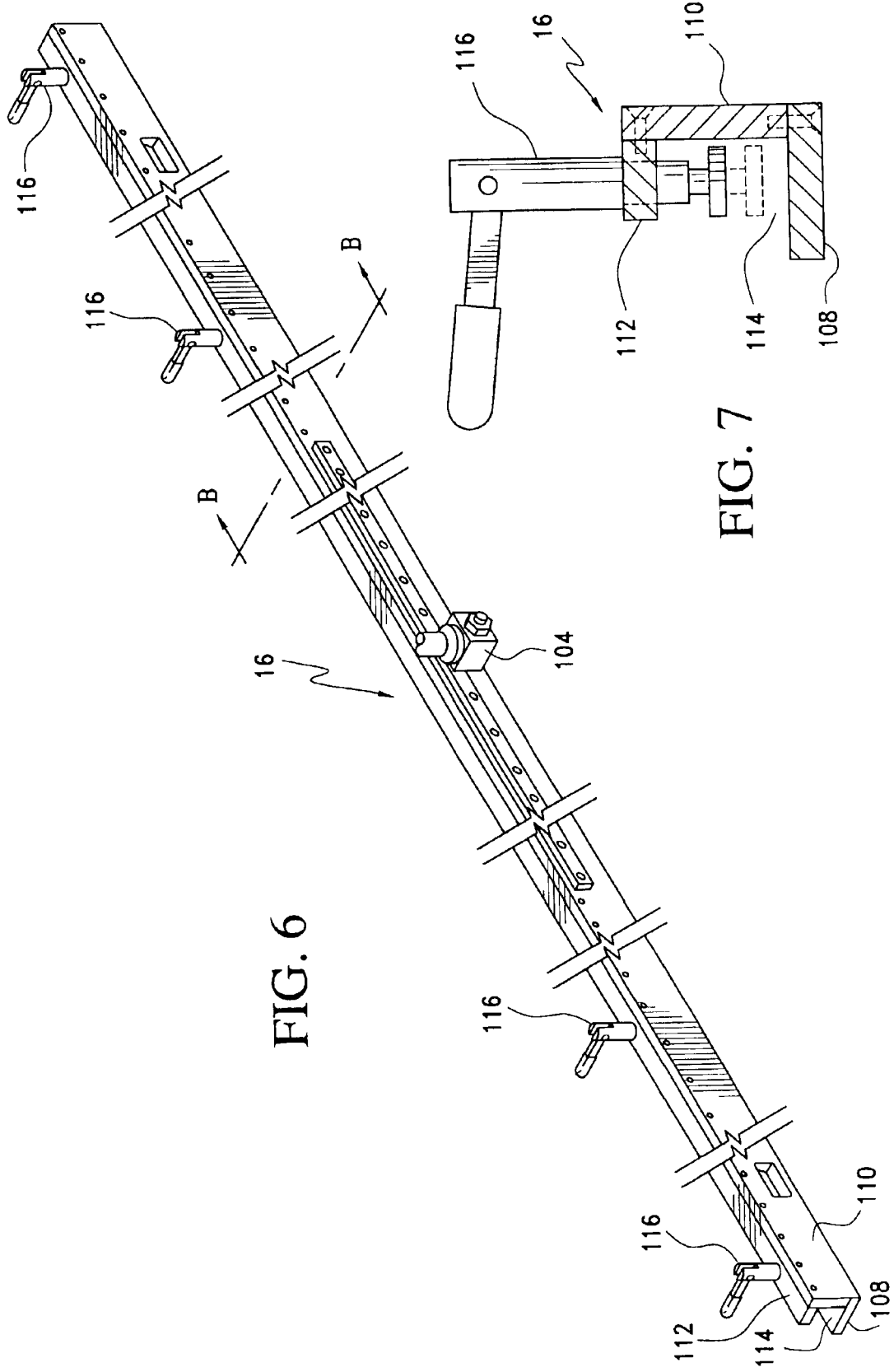

STATOR BAR HANDLER

CROSS REFERENCE TO RELATED DOCUMENTS

This Application is a Continuation-in-Part Application of Oliver et al., U.S. application Ser. No. 10/151,975, filed May 22, 2002 and entitled STATOR BAR HANDLER AND METHOD and now abandoned.

BACKGROUND OF THE INVENTION

The invention relates to a handler device for transporting a stator bar from its stator core slot to a repair area and for positioning the bar at the slot after repair and to a method to transport and position the bar.

Certain electrical devices for example power generators, have fluid cooled stator bars. Stator bars comprise insulated copper strands that are assembled in slots and brazed into copper clips on the ends to form bar assemblies. Each stator bar includes a combination of solid and hollow copper conductors, referred to as strands. The hollow strands provide a means for circulating coolant through the strand package to prevent a turbine generator from overheating and to increase the output of the generator by removing heat from the insulated bars.

The stator bars must be periodically maintained or repaired, for example to fix leaks. Repair of a leaking stator bar can require complete removal and fixing or replacement. If the bar is removed for repair, it is manually carried from its slot in the stator core to a repair area and carried back to the core when the repair is completed. If replaced, the heavy and unwieldy bar must be transported from a staging area for insertion into a slot within the stator core. Once the bar is inside the core, it is manually lifted and lowered to a correct slot and then inserted and wedged. Manually moving the unwieldy and heavy bars requires manpower and time and involves a safety hazard. There is a need to improve the method of transporting and manipulating a stator bar to position it to a correct slot so that the bar can be inserted and wedged into position.

BRIEF DESCRIPTION OF THE INVENTION

The present invention relates to a device for improving the transportation and manipulation of a stator bar particularly during a liquid cooled stator rewind procedure. The invention provides a flexible bar handler that comprises a mobile carriage; a lift boom assembly rotatably attached to rotate around a vertical axis of the carriage to swing a distal end of the boom assembly back and forth and pivotally attached to pivot around a horizontal axis of the carriage to raise and lower the distal end of the boom assembly; and a lift bracket comprising an elongated rail with receptor-shaped cross section to lengthwise accommodate a bar, the lift bracket being attached at a point on its length at the distal end of the longitudinal boom assembly opposed to a counter weight attached at an opposite proximal end of the boom assembly, wherein the lift bracket is pivotally attached to a horizontal pin at the point to permit the lift bracket to tilt to one side or the other so as to raise and lower the lift bracket ends.

In another embodiment, the flexible bar handler comprises a mobile carriage; a lift boom assembly comprising a longitudinal boom assembly extending from the carriage and comprising a plurality of sections with an extend and a retract functionality nested within one another in a retracted position and telescopically extended from one another in an extended position; and a lift bracket comprising an elongated rail with receptor-shaped cross section to lengthwise accommodate a bar, the lift bracket being attached at a point on its length at a distal end of the longitudinal boom assembly opposed to a counter weight attached at an opposite proximal end of the boom assembly, wherein the lift bracket is pivotally attached to a horizontal pin at the point to permit the lift bracket to tilt to one side or the other so as to raise and lower the lift bracket ends.

Another embodiment relates to a method of handling a stator bar; comprising loading the bar into a lift bracket comprising an elongated rail with receptor-shaped cross section, wherein the lift bracket is part of a flexible bar handler that includes a mobile carriage; manipulating the lift bracket by (i) swinging an end of the boom assembly back and forth, (ii) raising or lowering an end of the boom assembly, (iii) tilting the lift bracket to tilt the bracket to one side or the other so as to raise and lower the lift bracket ends or (iv) moving the bar forward or backward by the mobile carriage to position the bar for unloading into the stator slot; and unloading the bar into the slot.

In still another embodiment, a method of handling a stator bar; comprises manipulating the lift bracket by (i) swinging an end of the boom assembly back and forth, (ii) raising or lowering an end of the boom assembly, (iii) tilting the lift bracket to tilt the bracket to one side or the other so as to raise and lower the lift bracket ends to load the bar from a stator slot into a lift bracket comprising an elongated rail with receptor-shaped cross section, wherein the lift bracket is part of a flexible bar handler that includes a mobile carriage; (iv) moving the bar forward or backward by the mobile carriage to position the bar for unloading to a repair area; and unloading the bar at the repair area.

BRIEF DESCRIPTION OF THE DRAWINGS

FIG. 2 is a partially sectional side elevation view of the articulated stator bar handler;

FIG. 3 is a front sectional view of the handler carriage through line A—A of FIG. 2;

FIG. 6 is a perspective view of the lift bracket; and

FIG. 7 is a sectional front elevation view of the lift bracket through B—B of FIG. 6.

DETAILED DESCRIPTION OF THE INVENTION

The invention is an articulated mechanical device that that can be used to transport a stator bar into a core from a repair deck and to position it to a correct stator slot. The bar handler is designed with raising/lowering, projecting/retracting, tilting or transporting functionalities to facilitate manipulation of a bar, particularly a stator bar from a staging area to insert into a stator core bar slot. The bar is inserted into the slot and wedged into position. The device provides support for accurate positioning of the bar in relation to the slot and the end positions prior to insertion. In this application, a bar is a straight piece that is longer than it is wide. A stator bar is a flexible bar.

The device and method eliminate the physical stress involved in manually lifting, carrying and positioning a bar and at the same time reduce the total man-hours to manipulate the bar by 50 percent. The invention substantially reduces average cycle time for a liquid cooled stator rewind by as much as from 42 days to 22 days for 4 pole stators. The device and method reduce insulation damage to the bar by positioning laterally the bar at a core slot position prior to insertion to eliminate sliding the bar from bar slot end to end. The device and method are of particular advantage in the nuclear industry to reduce liquid cooled stator rewind cycle times, maintain quality and to provide short outage cycles. In one test, 10 technicians were used to transport and nest a 325 lb. stator bar into a mock 4 pole stator bore while the invention permitted installing the bar by four technicians.

The invention provides a stator bar handler that is functionalized to lengthwise cradle a longitudinal bar, for example a stator bar, to transport the bar by a mobile functionality, to raise and lower the bar, to tip the bar so that each end of the bar is raised or lowered, to generally move forward and backward to bring the bar into proximity of an insertion location such as a generator and to telescope the bar both forward and backward to manipulate the bar within tight quarters, for example into proximity of a stator bar slot. These features and further features of the invention will become apparent from the drawings and following detailed discussion, which by way of example without limitation describe preferred embodiments of the present invention.

Figure 1:
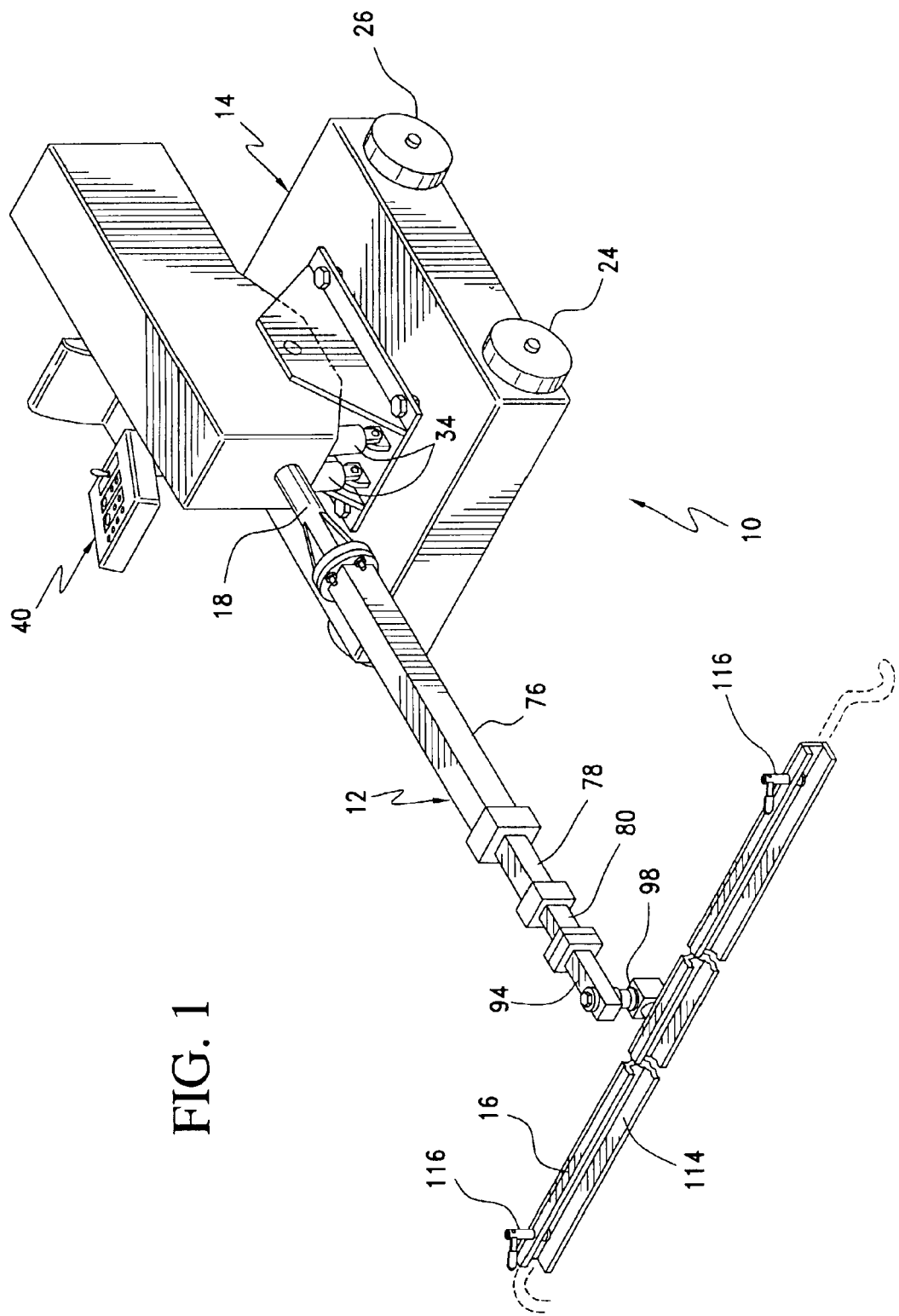
FIG. 1 is a perspective view of an articulated stator bar handler.

FIG. 1 is a perspective view of an articulated stator bar handler 10, FIG. 2 is a side elevation view of the articulated stator bar handler 10 and FIG. 3 is a front cut away view of the handler carriage 14 through line A—A of FIG. 2. FIGS. 1 to 3 show an articulated stator bar handler 10 comprising boom assembly 12, carriage 14 and lift bracket 16. The boom assembly 12 includes an elongated boom shaft 18 with counter weight 20. Lift bracket 16 is situated at opposing distal end of the boom assembly 12 from counter weight 20, which is located on the proximal boom assembly end. The proximal end is the end closest to the point of attachment of the boom assembly to the carriage 14. The boom shaft 18 is operatively mounted on carriage 14 to be hydraulically powered as hereinafter described.

Carriage 14 includes front wheels 24 and rear wheels 26, upper swivel unit 28 and lower swivel unit 30. Counterweight assembly 20 is secured to the opposing end of the shaft 18. Seat and control panel assembly 40 is operatively connected to the boom assembly 12 at carriage 14. Electric motor 32 and hydraulic rams 34 are located within upper carriage swivel unit 28 as hereinafter described.

In FIG. 2 and FIG. 3, carriage unit base 36 is shown enclosing electric motor 38, operatively connected to rear axle 42 through the combination of electric motor sprocket 44, chain 46 and rear axle chain sprocket 48. Electric motor 38 is activated through connection (not shown) to control panel assembly 40, whereby an operator can drive the carriage 14 forward and backward by driving rear axel 42 to drive rear wheels 26 connected through carriage unit base 36 via flange bushing 50. The motor 38, axle 42 and wheels 26 impart a mobile function to the stator bar handler 10 so that loaded stator bars can be transported, for example to and from a repair area to and from a stator bar slot in a generator core.

Lower swivel unit 30 is supported on carriage unit base 36 by rollers 52 and swivel base assembly 54. The combination of rollers 52 and swivel base assembly 54 impart a horizontal rotating functionality to the carriage 14 to permit manual horizontal orienting of the boom shaft 18 and correspondingly permit horizontal orienting of the lift bracket 16 at the opposing end of the shaft 18.

Upper swivel unit 28 of carriage 14 encloses an end of boom shaft 18, pivotally secured to up/down hydraulic rams 34 by a combination bushing 56 and keeper ring 58. The rams 34 are activated through hydraulic pump 60. Upon operator activation at control panel assembly 40, pump 60 drives rams 34 up or releases the rams down to correspondingly raise and lower the lift bracket 16 secured to the end of the shaft 18.

Electric motor 32 can be activated by an operator at control panel assembly 40 to rotate boom shaft around a longitudinal axis to correspondingly tip ends of the lift bracket 16 secured to the end of the shaft 18. When activated, motor 32 drives chain sprocket 62 to activate chain 64, which in turn drives sprocket 66, which is integral and circumferential to the radius of boom shaft 18. The motor drives the boom shaft 18 to rotate around a central longitudinal axis. As the shaft 18 rotates, lift bracket 16 is tilted one way and the other so that its ends are respectively raised or lowered.

Figure 4:
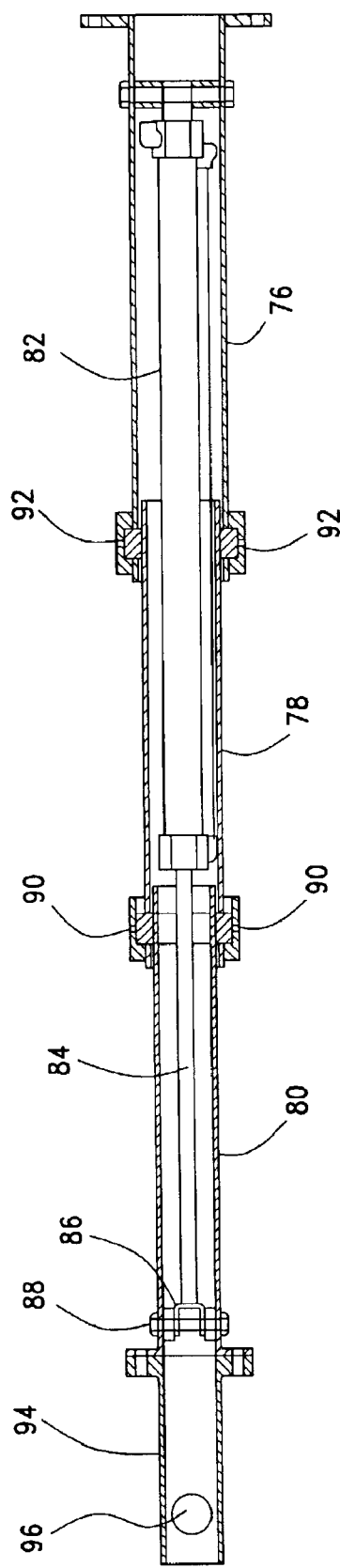
FIG. 4 is a side detail of the handler boom assembly.

In FIG. 2, hydraulic pump 68 is shown that drives fluid to hydraulic cylinder 70 that is connected to a fluid channel (not shown) within boom shaft 18 via bushing 72 and keeper ring 74. As shown in FIG. 2 and FIG. 4, boom assembly 12 further comprises first section 76, second section 78 and third section 80. Third section 80 is nested-fit within second section 78, which in turn is nested-fit into first section 76. The fluid channel through boom shaft 18 connects to a hydraulic ram assembly 82 that traverses first section 76. Hydraulic ram assembly 82 drives piston 84, which is shown extending through second section 78 and third section 80. Piston 84 is attached to a distal end of the third section from the ram assembly 82 by clevis 86 and bolt 88. The assembly 82 imparts a control to both extend and retract sections 78 and 80.

An operator at the seat control and panel assembly 40 can engage a control switch to activate the pump 68 to apply a fluid pressure to hydraulic cylinder 70. When the fluid cylinder 70 is activated, the fluid channel translates fluid pressure from hydraulic cylinder 70 to hydraulic ram assembly 82. Hydraulic ram assembly 82 drives piston 84, which in turn moves third section 80. The operator can disengage the control switch when desired extension is reached. By reversing fluid pressure, the operator can telescopically extend or retract third section 80 over collar and wear pads 90 into and from second section 78 and both sections over collar and wear pads 92 into and from first section 76.

Figure 5:
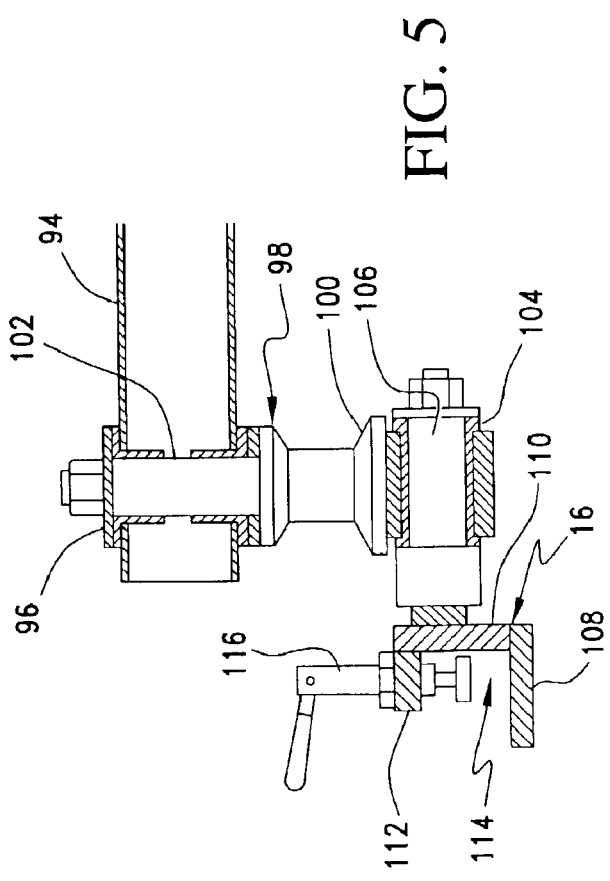
FIG. 5 is a side detail of a joint structure connecting the handler lift bracket to the boom assembly.

The telescopic extend and retract functionality provided by the nested sections 76, 78 and 80 imparts an extend and retract functionality to lift bracket 16, which is connected to the distal end of third section 80 by joint structure 98 connected through aperture 96 of boom end piece 94 as shown in FIG. 1, FIG. 2 and FIG. 5. With particular reference to FIG. 5, joint structure 98 includes boom end adapter 100, boom end adapter pin 102, lift bracket adapter 104 and lift bracket adapter pin 106. The boom end piece 94 accommodates the boom end adapter 100 by a pivotal connection through the aperture 96 of end piece 94 by vertical boom end adapter pin 102. The lift bracket adapter 104 accommodates lift bracket 16 that is pivotally secured through the lift bracket adapter 104 by lift bracket adapter pin 106. Pivotal connection by the boom end adapter 100 and the lift bracket adapter 104 allows the lift bracket 16 to be manually rotated in a horizontal plane and in a vertical plane.

Lift bracket 16 is described in detail with reference to FIG. 5. FIG. 6 and FIG. 7. FIG. 6 is a perspective view of the lift bracket 16 and FIG. 7 is a sectional front elevation view of the lift bracket through B—B of FIG. 6. The lift bracket is secured to boom assembly 12 by lift bracket adapter 104 that is part of joint structure 98. The lift bracket 16 includes elongated base flat bar 108, elongated back flat bar 110 and elongated top flat bar 112 that form a receptor-shaped cross section 114 for a stator bar. The flat bars can comprise aluminum or any other suitable structural material. The lift bracket 16 also includes a plurality of push/pull action toggle clamps 116 that secure the stator bar (shown in phantom as 118 in FIG. 1) in the square-C-shaped holder 114 formed by the bars 108, 110 and 112. In operation, a stator bar is loaded longitudinally along the longitudinal axis of the receptor-shaped cross section 114. Loading is facilitated by raising and lowering the lift bracket 16 ends and rotating the bracket as required to roll a stator bar onto and within the bracket 16 or to roll a stator bar from the bracket 16 within a stator bar slot. After a bar is loaded within the bracket 16, the push/pull action toggle clamps 116 are clamped to the bar to secure the bar within the receptor-shaped cross section older 114 while the bar is transported.

In this embodiment of the invention, the articulated bar handler 10 has (1) a mobile operational function that allows the carriage 14, boom assembly 12 and lift bracket 16 to be transported to a location for loading a stator bas and transporting the loaded stator bar to an unloading location for installing the bar into a stator core slot; (2) a rotating function that permits the boom assembly 12 to be horizontally rotated with respect to the carriage 14 to position ends of the lift bracket 16 toward or away from a load or unload point; (3) a power raising/lowering function that raises and lowers lift bracket 16 to accommodate loading and unloading of a stator bar; (4) a power telescoping function that extends or retracts the lift bracket toward and away from a location for a stator bar; (5) a manual horizontal rotating function for turning the lift bracket by hand in a horizontal plane; and (6) a manual vertical rotating function for rotating the lift bracket by hand in vertical planes at the lift bracket ends.

In operation, a stator bar can be longitudinally loaded into the handler lift bracket 16 comprising the elongated bars with receptor-shaped cross section and secured into the receptor shape by bar clamps, straps, cinches or fittings of the lift bracket 16. Typically an operator maneuvers the handler 16 by its mobile function (1) to a location within a turbine engine core with a longitudinal axis of the bracket 16 substantially parallel to the longitudinal axis of the stator bar. Then, the operator can utilize power raising and lowering function (3) to raise or lower the lift bracket 16 to a height of the stator bar slot and telescoping function (4) to bring the lift bracket 16 to a proximity of the stator bar slot. A worker utilizing manual functions (5) and (6) can then manually tip an end of the bracket 16 and horizontally rotate the bracket 16 to bring the end to a position at or near an end of the stator bar. The stator bar end can then be manually loaded to the near end of the bracket 16. The bracket is then brought close to the stator slot, section by section to facilitate loading of the stator bar, section by section receptor 114 of the bracket 16. As the stator bar is loaded, ii is clamped within the receptor 114 by push/pull toggle clamps 116. Once clamped within the bracket 16, the operator can level the bracket 16 and secured bar by power rotating function (2) to a substantially level position for transportation by mobile function (1) to a destination area, such as a repair area. Once at the destination area, the stator bar within bracket 16 can be manually and power operated according to functions (3), (4), (5) and (6) to facilitate unloading. A repaired stator bar or new stator bar can be installed back into stator bar slot of the generator core by reversing the described procedure of removing the bar.

While preferred embodiments of the invention have been described, the present invention is capable of variation and modification and therefore should not be limited to the precise details of the Examples. The invention includes changes and alterations that fall within the purview of the following claims.

What is claimed is:

1. A handler for flexible bars, comprising:
   a mobile carriage;
      a lift boom assembly rotatably attached to rotate around a vertical axis of the carriage to swing a distal end of the boom assembly back and forth and pivotally attached to pivot around a horizontal axis of the carriage to raise and lower the distal end of the boom assembly to fit one flexible bar at time; and
   a lift bracket comprising an elongated rail with receptor-shaped cross section to handle said flexible bar and defined by a transverse direction across the rail width, the receptor shaped cross section extending the length of the rail to lengthwise accommodate a bar, the lift bracket being attached at a point on its length at the distal end of the longitudinal boom assembly opposed to a counter weight attached at an opposite proximal end of the boom assembly, wherein the lift bracket is pivotally attached to a horizontal pin at the point to permit the lift bracket to tilt to one side or the other so as to raise and lower respective ends of the lift bracket.

2. The handler of claim 1, wherein the lift bracket is pivotally attached to a vertical pin at the point to permit the lift bracket to rotate horizontally.

3. The handler of claim 1, wherein the lift bracket is attached at the terminal end of the boom assembly by a shaft extension that is fitted to extend from within the boom assembly so as to telescopically retract into and extend from within the boom assembly.

4. The handler of claim 1, wherein the mobile carriage further comprises a front axle with connected wheels and a rear axle with connected wheels and a motor supported on the carriage and operatively connected to the rear wheel axle of the carriage.

5. The handler of claim 1, wherein the mobile carriage further comprises a front axle with connected wheels and a rear axle with connected wheels and a motor supported on the carriage and operatively connected to the rear wheel axle of the carriage through a combination of electric motor sprocket, chain and rear carriage axle chain sprocket.

6. The handler of claim 1, further comprising a control panel assembly operatively connected to the boom assembly at the mobile carriage for an operator to operate the handler.

7. The handler of claim 1, further comprising a control panel assembly operatively connected to the boom assembly at the mobile carriage and wherein the mobile carriage further comprises a front axle with connected wheels and a rear axle with connected wheels and a motor supported on the carriage and operatively connected to the rear wheel axle of the carriage and to the control panel assembly, whereby an operator can drive the carriage forward and backward by driving the rear axel to drive the rear wheels connected through the carriage unit base.

8. The handler of claim 1, further comprising an upper swivel unit and lower swivel unit supported on the carriage.

9. The handler of claim 1, further comprising an upper swivel unit and lower swivel unit supported on the carriage by rollers, wherein the upper swivel encloses an end of a boom shaft of the lift boom assembly that is pivotally secured to at least one up/down hydraulic ram activated through a hydraulic pump.

10. The handler of claim 1, wherein the lift bracket is attached at the distal end of the boom assembly by a shaft extension that is fitted to extend from within the boom assembly.

11. The handler of claim 1, wherein the lift bracket is attached at the distal end of the boom assembly by a shaft extension that is fitted to extend from within the boom assembly by rollers and wherein the handler further comprises an upper swivel unit and lower swivel unit supported on the carriage by rollers whereby a combination of the rollers and upper swivel unit imparts a horizontal rotating functionality to the carriage to permit horizontal orienting of the boom shaft and correspondingly to permit horizontal orienting of the lift bracket at the opposing end of the boom shaft.

12. The handler of claim 1, wherein the lift bracket is attached at the distal end of the boom assembly by a shaft extension that is fitted to extend from within the boom assembly by rollers and wherein the handler further comprises an upper swivel unit and lower swivel unit supported on the carriage by rollers wherein the mobile carriage further comprises up/down hydraulic rams located within the upper swivel unit and supported on the carriage and an end of boom shaft is pivotally secured to the up/down hydraulic rams to permit manual vertical orienting of the boom assembly and correspondingly to permit vertical orienting of the lift bracket at the distal end of the shaft.

13. The handler of claim 1, wherein the mobile carriage further comprises an upper swivel unit that encloses an end of an elongated boom shaft of the lift boom assembly, the boom shaft being pivotally secured to at least one up/down hydraulic ram activated through a hydraulic pump and connected to a control panel assembly whereby an operator can activate the pump driven rams up and down to correspondingly raise and lower the lift bracket secured to the distal end of the boom assembly.

14. The handler of claim 1, wherein the lift boom assembly extends from the mobile carriage and comprises a plurality of sections with an extend and a retract functionality nested within one another in a retracted position and telescopically extended from one another in an extended position.

15. The handler of claim 1, wherein the lift boom assembly extends from the mobile carriage and comprises a plurality of sections with an extend and a retract functionality nested within one another in a retracted position and telescopically extended from one another in an extended position; and a lift bracket comprising an elongated rail with receptor-shaped cross section to lengthwise accommodate a bar, the lift bracket being attached at a point on its length at a distal end of the longitudinal boom assembly opposed to a counter weight attached at an opposite proximal end of the boom assembly, wherein the lift bracket is pivotally attached to a horizontal pin at the point to permit the lift bracket to tilt to one side or the other so as to raise and lower the lift bracket ends.

16. A handler for flexible bars, comprising:
a mobile carriage;
a lift boom assembly comprising a longitudinal boom assembly to fit one flexible bar at a time extending from the carriage and comprising a plurality of sections with an extend and a retract functionality nested within one another in a retracted position and telescopically extended from one another in an extended position; and
a lift bracket comprising an elongated rail with receptor-shaped cross section to handle said flexible bar and defined by a transverse direction across the rail width, the receptor shaped cross section extending the length of the rail to lengthwise accommodate a bar, the lift bracket being attached at a point on its length at a distal end of the longitudinal boom assembly opposed to a counter weight attached at an opposite proximal end of the boom assembly, wherein the lift bracket is pivotally attached to a horizontal pin at the point to permit the lift bracket to tilt to one side or the other so as to raise and lower the lift bracket ends.

17. The handler of claim 16, wherein the boom assembly sections are nested within one another in a retracted position and telescopically extended from one another in an extended position.

18. A handler for flexible bars, comprising:
a mobile carriage;
a lift boom assembly rotatably attached to rotate around a vertical axis of the carriage to swing a distal end of the boom assembly back and forth and pivotally attached to pivot around a horizontal axis of the carriage to raise and lower the distal end of the boom assembly to fit one flexible bar at a time; and
a lift bracket with an elongated rail with receptor-shaped means defined by a transverse direction across the rail to lengthwise handle said flexible bar, the lift bracket being attached at a point on its length at the distal end of the longitudinal boom assembly opposed to a counter weight attached at an opposite proximal end of the boom assembly,
wherein the lift bracket is pivotally attached to a horizontal pin at the point to permit the lift bracket to tilt to one side or the other so as to raise and lower respective ends of the lift bracket;
further wherein the lift bracket is attached to the distal end of the longitudinal boom assembly by a shaft extension that is fitted to extend from within the boom assembly by rollers; and
further wherein the handler comprises an upper swivel unit and lower swivel unit supported on the carriage by rollers wherein the mobile carriage further comprises up/down hydraulic rams located within the upper swivel unit and supported on the carriage and an end of boom shaft is pivotally secured to the up/down hydraulic rams to permit manual vertical orienting of the boom assembly and correspondingly to permit vertical orienting of the lift bracket at the distal end of the shaft.

19. A handler for flexible bars, comprising:
a mobile carriage;
a lift boom assembly rotatably attached to rotate around a vertical axis of the carriage to swing a distal end of the boom assembly back and forth and pivotally attached to pivot around a horizontal axis of the carriage to raise and lower the distal end of the boom assembly to fit one flexible bar at a time; and
a lift bracket comprising an elongated rail with receptor-shaped means defined by a transverse direction across the rail to lengthwise handle said flexible bar, the lift bracket being attached at a point on its length at the distal end of the longitudinal boom assembly opposed to a counter weight attached at an opposite proximal end of the boom assembly, wherein the lift bracket is pivotally attached to a horizontal pin at the point to permit the lift bracket to tilt to one side or the other so as to raise and lower respective ends of the lift bracket.

* * * * *